(12) United States Patent
Cohen et al.

(10) Patent No.: US 7,627,484 B2
(45) Date of Patent: Dec. 1, 2009

(54) METHOD AND APPARATUS FOR MANAGING AND DISPLAYING USER AUTHORIZATIONS FOR A BUSINESS PROCESS MANAGED USING A STATE MACHINE

(75) Inventors: Mitchell Adam Cohen, Yorktown Heights, NY (US); John Scott Houston, Hopewell Junction, NY (US); Jianren Li, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 09/951,024

(22) Filed: Sep. 11, 2001

(65) Prior Publication Data

US 2003/0050885 A1 Mar. 13, 2003

(51) Int. Cl.
G06F 17/60 (2006.01)
G06F 17/30 (2006.01)

(52) U.S. Cl. .............................. 705/1; 705/37; 705/80; 705/31; 705/7; 707/2; 707/3; 707/4; 707/5

(58) Field of Classification Search ....................... None
See application file for complete search history.

(56) References Cited

U.S. PATENT DOCUMENTS

| | | | |
|---|---|---|---|
| 4,989,132 A | 1/1991 | Mellender et al. | |
| 5,396,630 A | 3/1995 | Banda et al. | |
| 5,706,452 A | 1/1998 | Ivanov | |
| 5,799,285 A | 8/1998 | Klingman | |
| 6,055,519 A | 4/2000 | Kennedy et al. | |
| 6,343,275 B1 | 1/2002 | Wong | |
| 6,470,338 B1 * | 10/2002 | Rizzo et al. | 707/6 |
| 6,470,388 B1 * | 10/2002 | Niemi et al. | 709/224 |
| 6,665,648 B2 * | 12/2003 | Brodersen et al. | 705/7 |

(Continued)

OTHER PUBLICATIONS

Dictionary Definitions of "state machine", "state", "flag", "monitor", "transition", "flow", "domain", and "logic" have been attached and sent to Applicant.*

(Continued)

Primary Examiner—John G. Weiss
Assistant Examiner—Matthew L. Brooks
(74) Attorney, Agent, or Firm—Sawyer Law Group P.C.

(57) ABSTRACT

A method and apparatus are disclosed for managing access control for a business process that is managed using a state machine. A domain represents the various trading mechanisms that are supported by a business process. Domains are placed at the highest level in a tree structure. Within each domain, there is one or more different flow types defined, such as flow types for buyers and sellers. Within each flow type, one or more flows or business processes may be defined. A flow defines the order of the steps required to produce an object. Each flow typically begins with a mandatory "start" state, having one or more transitions to additional states. Each transition may contain an access control guard. The guards on the transitions leading from the start state can be referenced to determine the user's authorization to access the domains, flow types, and flows. In this manner, the menu of options presented to the user may be automatically tailored to present only those actions which the particular user is authorized to perform. Thus, a navigational tool is provided that presents the various valid choices that are available to the end-user.

20 Claims, 7 Drawing Sheets

```
Retrieve all flow ids from the FLOW table
    For each flow id
        Retrieve all transitions from the START state for this flow id
            Call business logic guard(s) to determine if this transition may be
                    invoked by this user at this time
            If no, then continue to next transition from this START state Call policy manager to check access control to determine if this
                    transition may be invoked by this user
            If yes, then save this flow id to present to the user
                Continue with next flow id
            If no, then continue to next transition from this START state
    Supply the list of allowable flow ids to the User Interface for display to the user
```

U.S. PATENT DOCUMENTS

| | | | |
|---|---|---|---|
| 6,763,353 B2 | 7/2004 | Li et al. | |
| 6,813,278 B1 | 11/2004 | Swartz et al. | |
| 6,820,266 B1 | 11/2004 | Minakawa et al. | |
| 7,069,242 B1* | 6/2006 | Sheth et al. | 705/37 |
| 7,249,074 B1 | 7/2007 | Land et al. | |
| 2002/0026410 A1 | 2/2002 | Woloshin et al. | |
| 2002/0032590 A1 | 3/2002 | Anand et al. | |
| 2002/0069154 A1* | 6/2002 | Fields | 705/37 |
| 2002/0133395 A1 | 9/2002 | Hughes et al. | |
| 2002/0161608 A1 | 10/2002 | Loveland | |
| 2003/0014368 A1 | 1/2003 | Leurig et al. | |
| 2003/0101133 A1* | 5/2003 | DeFrancesco et al. | 705/38 |

OTHER PUBLICATIONS

CaseMatch (received from the "wayback" machine; Note because there is a patent No. 6,470,338 which supports CaseMatch and was sufficient for a 102(b) rejection Examiner has labeled CaseMatch (HomePage) for this action).*

Definition of "conditional logic" as taken from the freedictionary.com.*

Muth et al., "Enterprise-Wide Workflow Management Based on State and Activity Charts", in: A. Dogac, L. Kalinichenko, T. Özsu, A. Sheth, (Eds.): Workflow Management Systems and Interoperability, Springer Verlag, (1998).

"Supply-Chain Operations Reference Model; Overview of SCOR Version 5.0," Supply-Chain Council, Inc., (2001), downloaded from www.supply-chain.org on Mar. 12, 2002.

Microsoft Press Computer Dictionary, Computer Reference, 9 pages, Third Edition, Microsoft Press USA.

"Authoritative Dictionary of IEEE Standards Terms," Seventh Edition, Published by Standards Information Network, IEEE Press, p. 1102.

xreferplus—conditional—Academic Press Dictionary of Science Technology, 1 page.

xreferplus—logic—The American Heritage Concise Dictionary, 1 page.

Newton, Harry, "Newton's Telecom Dictionary," 10 pages, 20th updated and Expanded Edition, CMP Books.

The Authoritative Dictionary of IEEE Standards Terms, 10 pages, 7th Edition, Standards Information Network IEEE Press.

Office Action mailed Sep. 4, 2008 for U.S. Appl. No. 09/951,028.
Response of Nov. 12, 2008 for U.S. Appl. No. 09/951,028.
Office Action mailed Sep. 4, 2008 for U.S. Appl. No. 09/951,027.
Response of Nov. 19, 2008 for U.S. Appl. No. 09/951,027.
Office Action mailed Jul. 17, 2008 for U.S. Appl. No. 09/951,026.
Response of Sep. 12, 2008 for U.S. Appl. No. 09/951,026.
Office Action mailed Sep. 4, 2008 for U.S. Appl. No. 09/951,029.
Response of Nov. 12, 2008 for U.S. Appl. No. 09/951,029.

Mark Tew, Power Point Presentation of Mealy and Moore Machine, retrieved from http://www.olemiss.edu/courses/EE/ELE_335/Spring2000/Htmlnotes/MealyMooreSTTSTD/index.htm, Mar. 14, 2000.

Office Action issued Apr. 28, 2009 for the U.S. Appl. No. 09/951,027, 69 pages.

Whatis.com, "Finite State Machine", http://seachcio-midmarket.techmarket.com/sDefinition/0,sid183_gci213052,00. html.

Thiyagarajan Veluchamy, "Finite State Machine", http://thiyagarajan.wordpress.com/glossary/.

* cited by examiner

```
Retrieve all flow ids from the FLOW table
    For each flow id
        Retrieve all transitions from the START state for this flow id
            Call business logic guard(s) to determine if this transition may be
                invoked by this user at this time
            If no, then continue to next transition from this START state Call policy manager to check access control to determine if this
                transition may be invoked by this user
            If yes, then save this flow id to present to the user
                Continue with next flow id
            If no, then continue to next transition from this START state
    Supply the list of allowable flow ids to the User Interface for display to the user
```

FIG. 4

USER A NAVIGATION BAR

FIG. 5A

ORGANIZATION FLOW DATABASE - 500

| FlowAdmin_Id | Flow_Id | OrgEntity_Id | Store_Id |
|---|---|---|---|
| BIGINT NOT NULL | BIGINT NOT NULL | INTEGER NOT NULL | INTEGER NOT NULL |
| 12 | 6101 | 3 | 107 |

FIG. 5B

FLOW DATABASE - 550

| Flow_Id | FlowType_Id | Identifier | Role |
|---|---|---|---|
| BIGINT NOT NULL | BIGINT NOT NULL | VARCHAR(64) NOT NULL | VARCHAR(64) |
| 6101 | 451 | RFQreq23 | Buyer |
| 6102 | 451 | RFQreq101 | Buyer |
| 7202 | 552 | RFQrsp01 | Seller |
| 7204 | 559 | RFQrsp27 | Seller |

METHOD AND APPARATUS FOR MANAGING AND DISPLAYING USER AUTHORIZATIONS FOR A BUSINESS PROCESS MANAGED USING A STATE MACHINE

CROSS REFERENCE TO RELATED APPLICATIONS

The present invention is related to U.S. patent application entitled "Method and Apparatus for Automatic Transitioning Between States in a State Machine That Manages a Business Process,", Ser. No. 09/951,028, U.S. patent application entitled "Method and Apparatus for Managing The Versioning of Business Objects Using a State Machine,", Ser. No. 09/951,027, U.S. patent application entitled "Method and Apparatus for Creating and Managing Complex Business Processes," Ser. No. 09/951,026, U.S. patent application entitled "Method and Apparatus for Monitoring Execution of a Business Process Managed Using a State Machine," Ser. No. 09/951,025 and U.S. patent application entitled "Method and Apparatus for Managing a User Group List For a Business Process Managed Using a State Machine," Ser. No. 09/951,029, filed contemporaneously herewith, assigned to the assignee of the present invention and incorporated by reference herein.

FIELD OF THE INVENTION

The present invention relates generally to techniques for representing business processes as state machines, and more particularly, to a method and apparatus for displaying the authorized actions for a user for a business process that is managed using a state machine.

BACKGROUND OF THE INVENTION

Business processes are often used to manage various trading mechanisms, such as auctions, contracts, and requests for quotes (RFQs). At the same time, much of business revolves around making decisions and other user actions. Typically, these decisions are made by authorized individuals acting on behalf of their organizations, applying a variety of rules or guidelines. The actual decision-making logic may be simple or extremely complex depending upon the needs of the business and the decision being made. However, the demands on decision-makers are rapidly increasing along with the pace of business. This leaves the decision-makers overloaded, many times with trivial decisions, thus decreasing the amount of time that they have to focus on more important decisions. It has been found that business processes can be represented using a state machine. State machines provide a way to control the set of events and actions that may be performed by authorized users throughout the life cycle of a business object.

Among other benefits, state machines provide a means for automating some decision-making. For example, if the number of levels of approval in a business process could be configured in such a way that it appeared to dynamically change at run time to match the requirements of the user organization, then many organizations would be able to share the same business process. If this same mechanism also allowed automatic decision-making support for the more routine decisions, then the workload of the decision-makers could be eased to allow them to focus their attention on the more difficult matters. Overall, there would be increased flexibility without increased expense or complexity.

As more businesses move towards electronic commerce, especially for business-to-business transactions, the number of business processes and trading mechanisms they are using is increasing significantly. To date, most of the innovation in technology has focused on improving the business processes and trading mechanisms themselves. The management of the diverse set of business processes has been mostly ignored.

In order for the user operating within these environments to be highly productive, the user must be able to rapidly select the trading mechanism and business process required for each transaction. Too often it is easy for users to select the wrong process and erroneously follow paths which lead to a rejection after a great deal of time and effort has already been invested.

A need therefore exists for a means for organizing state machines to provide a natural flow for the users of the state machine. The navigation of a state machine is particularly challenging when the associated organizations define and use many different business processes in a variety of trading mechanisms. The selection and identification of which trading mechanism and then which business process to use for each object will likely be based upon the specific organization within the marketplace and possibly a user-selection.

SUMMARY OF THE INVENTION

Generally, a method and apparatus are disclosed for illustrating the actions that a user can perform for a business process that is managed using a state machine. A domain represents the various trading mechanisms that are supported by a business process, such as auctions, contracts, and requests for quotes (RFQs), and are placed at the highest level in a tree structure. Within each domain, there is one or more different flow types defined, such as flow types for buyers and sellers. Within each flow type, one or more flows or business processes may be defined. A flow defines the order of the steps required to produce an object, such as an RFQ, including any required steps for approval. Each flow typically begins with a mandatory "start" state, having one or more transitions to additional states. Each transition may contain an access control guard.

According to one aspect of the invention, the guards on each start state control access to the various possible flows by each user. Thus, the guards on the transitions leading from the start state can be referenced to determine the user's authorization to access the domains, flow types, and flows. In this manner, the menu of options presented to the user may be automatically tailored to present only those actions which the particular user is authorized to perform. Thus, according to another aspect of the invention, a navigational tool is provided that presents the various valid choices that are available to the end-user.

A more complete understanding of the present invention, as well as further features and advantages of the present invention, will be obtained by reference to the following detailed description and drawings.

DETAILED DESCRIPTION OF PREFERRED EMBODIMENTS

The present invention provides a navigational tool for illustrating the actions that a user can perform for a business process that is managed using a state machine. A business process management system is disclosed that classifies the trading mechanisms that are managed and extends access control capabilities to filter the set of options presented to a user. As discussed further below, the hierarchy of trading mechanisms is presented to the user as a tree structure. However, the view for the users in any one organization operating within a given marketplace may be a fairly heavily pruned tree.

Domains represent the various trading mechanisms that are supported, such as auctions, contracts, and requests for quotes (RFQs), and are placed at the highest level in the tree structure. Within each domain, there is one or more different flow types defined. Many of the trading mechanisms will actually have two flow types defined, one for the buyer and one for the seller. For example, a request for quotes trading mechanism typically defines business processes for managing the creation and processing of the request for quotes itself, as well as for managing any responses to the request for quotes.

Within each flow type, one or more flows or business processes may be defined. A flow defines the order of the steps required to produce an object, such as an RFQ, including any required steps for approval. Typically, there are a number of possible business processes from which an organization may select. Each flow typically begins with a mandatory "start" state. From the start state, there may be one or more transitions to additional states. Each transition may contain an access control guard and optionally a business control guard.

According to one feature of the present invention, the guards are used to control access to the flows by each user. Furthermore, the guards are used to drive the available options presented to users when navigating through the selection of trading mechanisms and flows. In this manner, the menu of options presented to the user may be automatically tailored by the business flow manager of the present invention to present only those actions which the particular user is authorized to perform. In other words, if the organization to which the user belongs only utilizes, for example, the auction and request for quotes trading mechanisms, and the user has been authorized by the organization administrator to operate in these environments, then those options are the only options provided to the user, when a trading mechanism must be selected.

Figure 8:
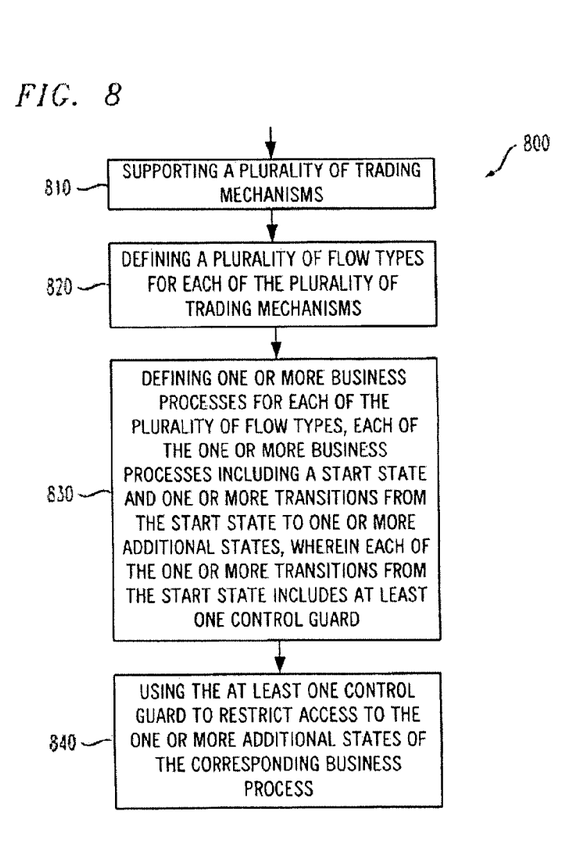
FIGS. 8-9 illustrate exemplary methods for managing business processes in accordance with various embodiments of the present invention.

An exemplary method 800 for managing business processes in accordance with one embodiment of the present invention is illustrated in FIG. 8. Method 800, which corresponds to steps described above, includes supporting a plurality of trading mechanisms at 810, defining a plurality of flow types for each of the plurality of trading mechanisms at 820, defining one or more business processes for each of the plurality of flow types at 830, where each of the one or more business processes includes a start state and one or more transitions from the start state to one or more additional states and each of the one or more transitions from the start state includes at least one control guard, and using the at least one control guard to restrict access to the one or more additional states of the corresponding business process at 840.

State Machine Terminology

Figure 1:
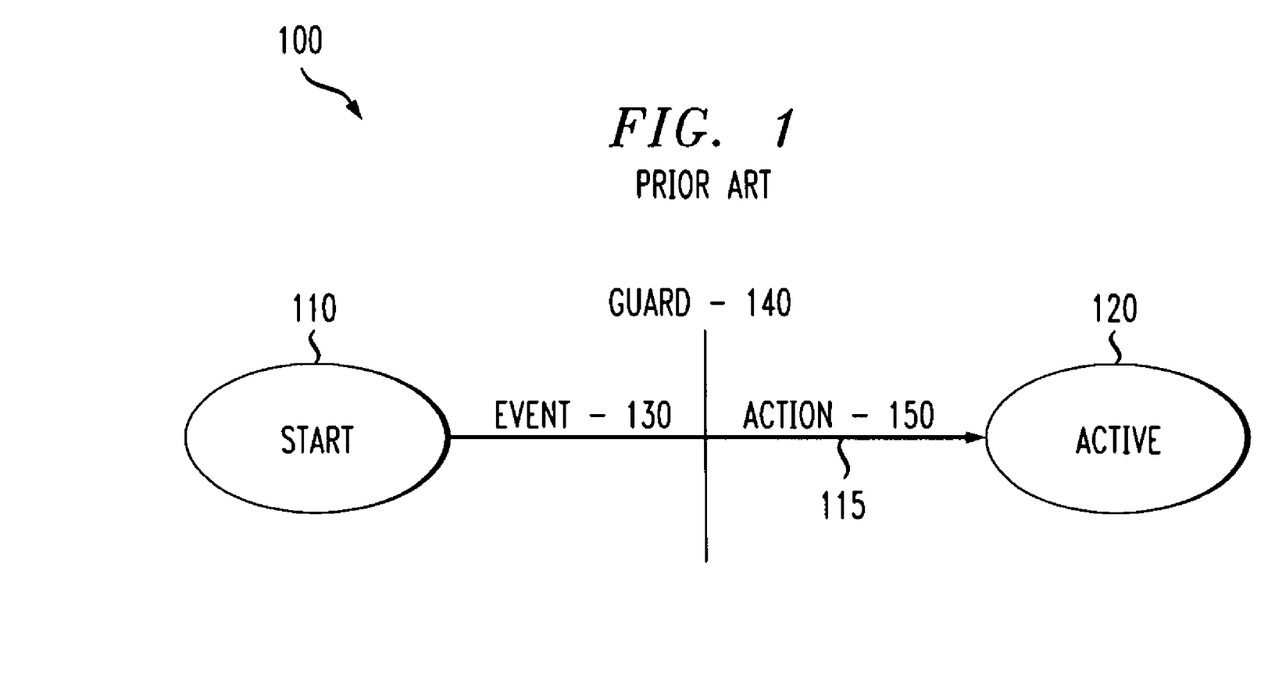
FIG. 1 illustrates an exemplary conventional state machine having two states for managing a business process.

Business processes can be represented using a state machine. State machines provide a way to control the set of events and actions that may be performed throughout the life cycle of a business object. The Unified Modeling Language (UML) provides a standardized syntax for describing state machines. FIG. 1 illustrates an exemplary state machine 100 having two states 110, 120 with a single transition 115 leading from the Start state 110 to the Active state 120. The transition 115 is composed of three parts. First, there is an event 130 that defines what may cause this transition 115 to be attempted. Second, one or more guards 140 determine whether or not the transition 115 may be taken based upon some predefined criteria, such as the authority of the user or certain values associated with the business object. Finally, the action 150 provides a means for identifying logic that may act upon, or on behalf of, the object being managed by the state machine 100. Thus, if the transition 115 is allowed according to the guards 140, then the action 150 is performed and the object moves into the Active state 120. The various components of a transition 115 can be expressed using the notation "event [guard] action."

For a more detailed discussion of techniques for managing business processes using a state machine, see, for example, U.S. patent application Ser. No. 09/818,719, filed Mar. 27, 2001, entitled "E-Market Architecture for Supporting Multiple Roles and Reconfigurable Business Processes," August-Wilhelm Scheer, Aris—Business Process Modeling, Springer Verlag, 1999 or Peter Muth et al., Enterprise-Wide Workflow Management Based on State and Activity Charts, in A. Dogac, L. Kalinichenko, T. Ozsu, A. Sheth (Editors), Workflow Management Systems and Interoperability, Springer Verlag, 1998, each incorporated by reference herein.

Figure 2:
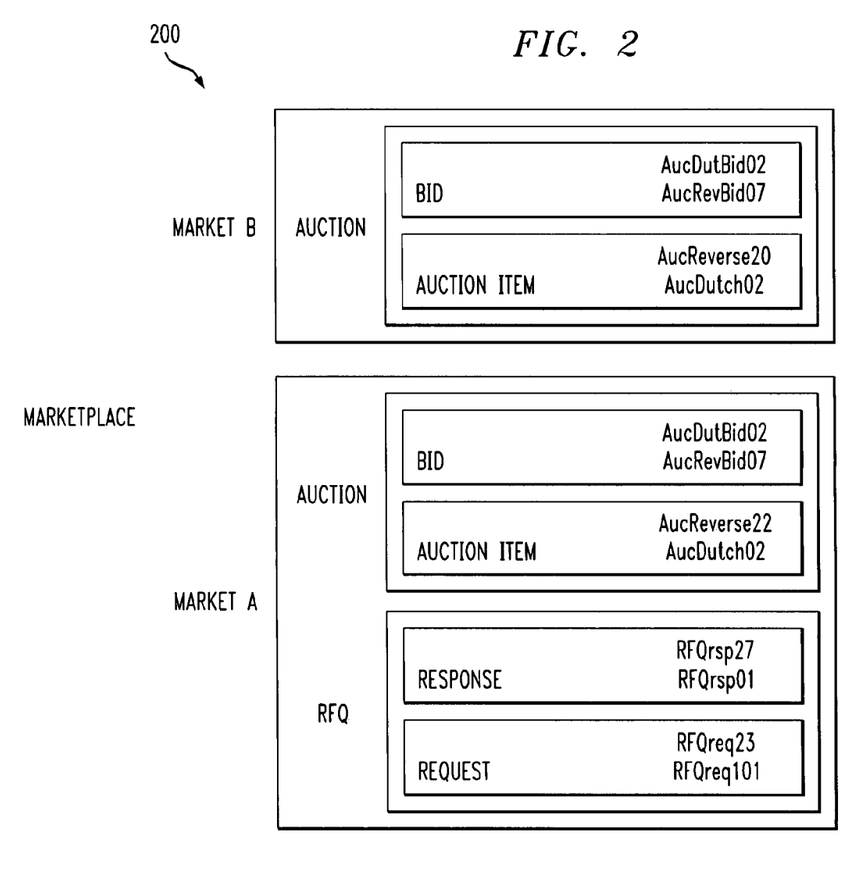
FIG. 2 illustrates the hierarchical nature of a marketplace where organizations interact to conduct business-to-business actions in an online marketplace.

With this basic understanding of the UML syntax, consider an overview of an exemplary online marketplace, such as the marketplace 200 shown in FIG. 2. FIG. 2 shows the hierarchical nature of a marketplace 200 where organizations interact to conduct business-to-business actions in an online marketplace. The marketplace 200 may consist of multiple markets, each with its own set of trading mechanisms (domains). Each domain may then consist of one or more flow types, and each flow type may consist of one or more flows (business processes). The business processes themselves may be used within multiple markets In this example, the marketplace 200 includes companies that deal with clothing-related items. In Market_A, the clothing manufacturers may interact with suppliers of fabric and other clothing accessories. Meanwhile, in Market_B, the clothing manufacturers may interact with wholesale clothing distributors who will purchase their finished goods.

In this example, Market_A supports trading mechanisms for Requests For Quotes (RFQs) and Auctions, while Market_B supports only Auctions. A trading mechanism, such as an RFQ or auction, is referred to herein as a domain. Within a domain, there are typically two different perspectives, referred to herein as flow types, one for the buyer and one for the seller, each with its own set of business processes. In the example of FIG. 2, the buyers use RFQ Requests in the RFQ domain and Bids in the Auction domain, while the sellers use RFQ Responses and Auction Item. Each flow type will in turn include one or more business processes or flows, designated RFQreq101 and RFQrsp01 in FIG. 2. These two flows are specific implementations of an RFQ request and RFQ response, respectively.

Although FIG. 2 displays the complete set of options available within the exemplary marketplace 200, not all organizations may choose to operate within all markets or domains. Nor may organizations necessarily use all of the defined flows. This choice is reserved for each organization to make, based upon its own particular business needs. Continuing the clothing example of FIG. 2, a wholesale distributor may have no need to operate within Market_A, so it would only want its employees to have access to Market_B. In addition, since the organization may not intend to sell anything within Market_B, the company would probably restrict access to the Bid flow type within the Auction domain. Moreover, the company may wish to only use Dutch Auctions. This means that all of their employees may only use business processes (flows) in the Bid flow type that supported Dutch Auctions. In this example, there is only one such flow, AucDut02. Other organizations in this marketplace, of course, will also likely want to restrict access to markets, trading mechanisms, flow types and business processes according to their own needs.

Now consider a clothing manufacturer that operates within both Market_A and Market_B. Overall, this company may use more of the available domains and flow types and a different set of the provided flows than the wholesale distributor does. However, the company may not want to allow all of its employees to have access to all domains, flow types or flows. Therefore, it is likely that each user, or group of users, in the company may have a slightly different view of the overall marketplace.

According to another aspect of the invention, a navigational tool is provided that presents the various valid choices that are available to the end-user. Each business process (flow) begins with a start state. The guards on the transitions leading from the start state will be referenced to determine the users' access to the domains, flow types, and flows. The guards defined by the creator of the business flows, combined with the user roles assigned by the organization administrator from their company, along with any additional controls from the access control and business guards, are used to filter the set of flows made available to any given user.

Once a set of options available to the user have been identified, the user is presented with only a set of valid and permissible choices. For example, out of the many options defined in the marketplace, one user may only be allowed to work with Auction Items. Meanwhile, another user may be able to work with Auction Bids and RFQ Requests. By limiting the list of options presented to the user to those which the user is allowed to perform, the frustration of wasting time pursuing options which will ultimately lead to failure or denial is avoided.

Figure 9:
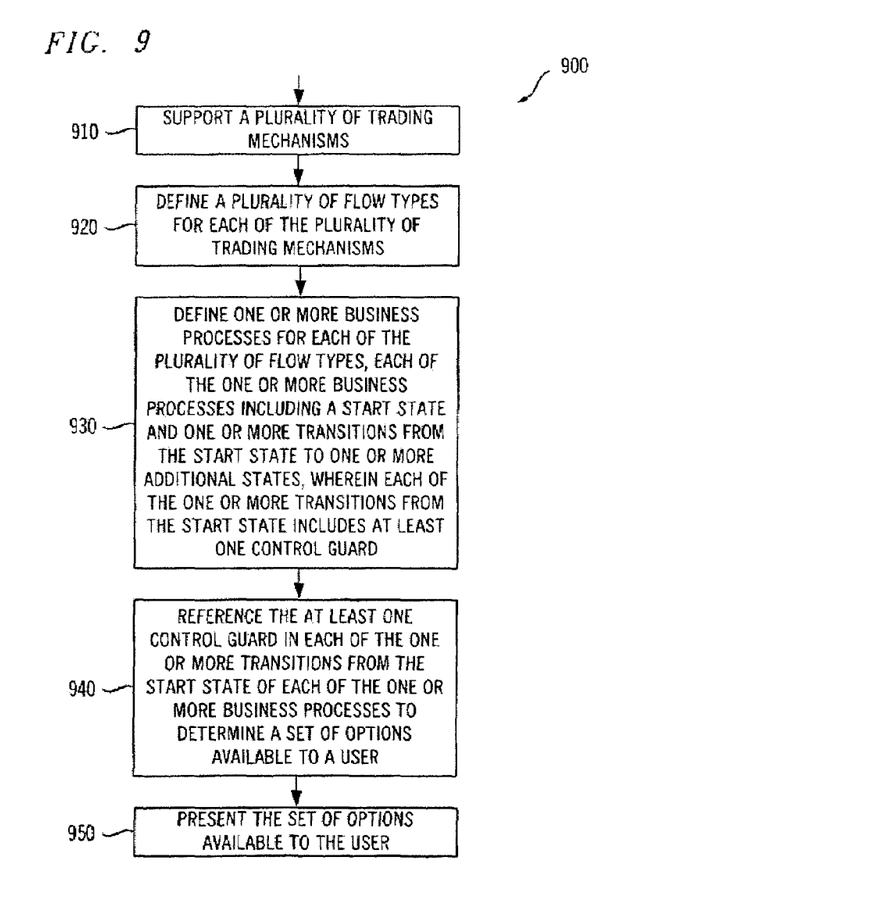

FIG. 9 illustrates an exemplary method 900 for managing business processes in accordance with one embodiment of the present invention. Method 900, which corresponds to steps described above, includes supporting a plurality of trading mechanisms at 910, defining a plurality of flow types for each of the plurality of trading mechanisms at 920, defining one or more business processes for each of the plurality of flow types at 930, where each of the one or more business processes includes a start state and one or more transitions from the start state to one or more additional states and each of the one or more transitions from the start state includes at least one control guard, referencing the at least one control guard in each of the one or more transitions from the start state of each of the one or more business processes to determine a set of options available to a user at 940, and presenting the set of options available to the user at 950. The set of options in the embodiment includes at least one of the plurality of trading mechanisms, at least one of the plurality of flow types defined for the at least one trading mechanism, and at least one of the one or more business processes defined for the at least one flow type.

There are a number of ways to implement each of the aspects behind this overall design. First, to determine the set of options available to the user, all of the transitions which lead out of the Start states of all of the business processes are identified and the guards are executed for each of them. The transitions which have guards which would be satisfied are returned to be presented to the user interface. For example, the exemplary logic shown in FIG. 3 may result in a given user, such as User A, being determined to have access to the RFQ and Auction trading mechanisms. An appropriate user interface is shown in FIG. 4 for the example of FIG. 3. It is noted that the Contract trading mechanism is indicated in FIG. 4 with a strike-through, indicating that the Contract trading mechanism is not available to this user. Furthermore, for the RFQ trading mechanism, the user is authorized to participate in Fast RFQs, Multiround RFQs and Standard RFQs. Likewise, for the Auction trading mechanism, the user is authorized to participate in Dutch Auctions, Reverse Auctions and Standard Auctions.

Figure 5A:
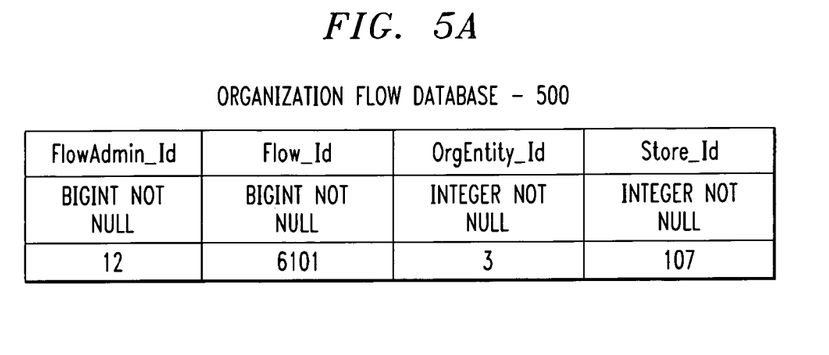
FIGS. 5A and 5B are sample tables that are employed to help increase the speed of filtering the set of flows and transitions that are checked in accordance with the present invention.
Figure 5B:
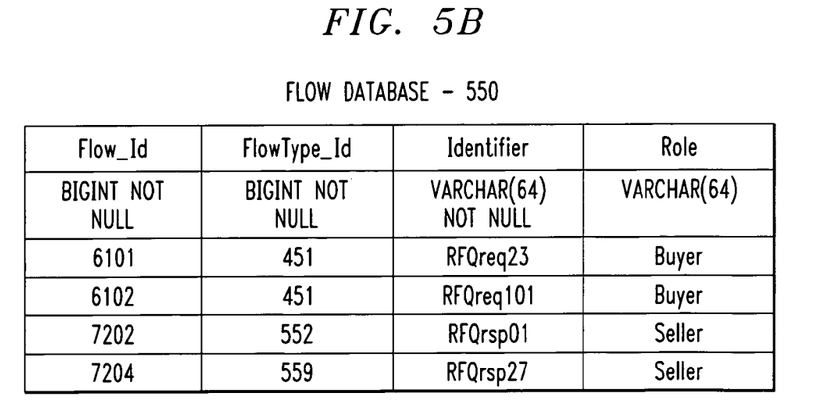

FIGS 5A and 5B illustrate exemplary databases (or additional columns to existing database tables) that can be employed to increase the speed of filtering the set of flows and transitions that are checked in accordance with the present invention. FIG. 5A illustrates an organizational flow database 500 that provides organizational information. The organizational flow database 500 allows quick reference of the markets and domains used by an organization (using the organization ID), thus allowing you to quickly limit the flow search. The table 500 can be searched for all flows where the OrgEntity_Id matches the user's organization, and then only the guards for this set of flows has to be checked. Likewise, FIG. 5B is a sample table from a flow database that includes a Role column. In this manner, the table 550 can be searched for all flows where the Role is equal to the role of the current user and thereby limit the number of guards that need to be checked.

Figure 3:
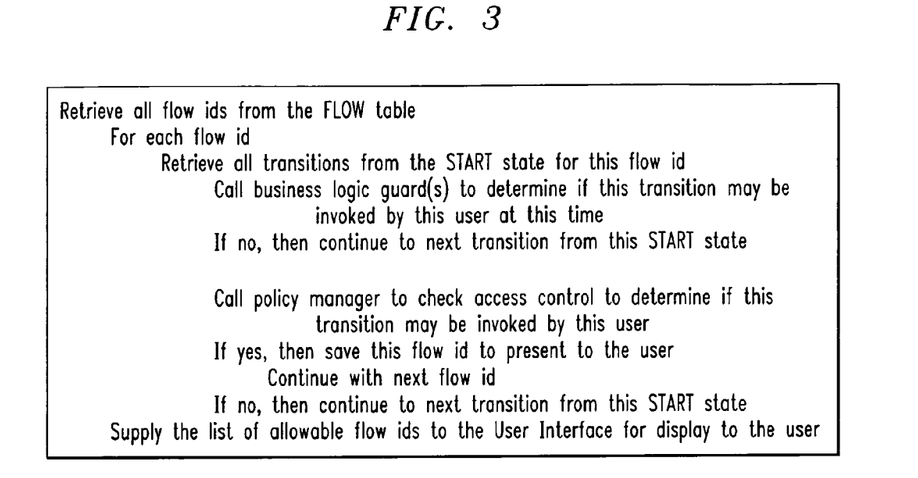
FIG. 3 illustrates exemplary code that may be utilized as a guard for a start state in a state machine in. accordance with the present invention.
Figure 4:
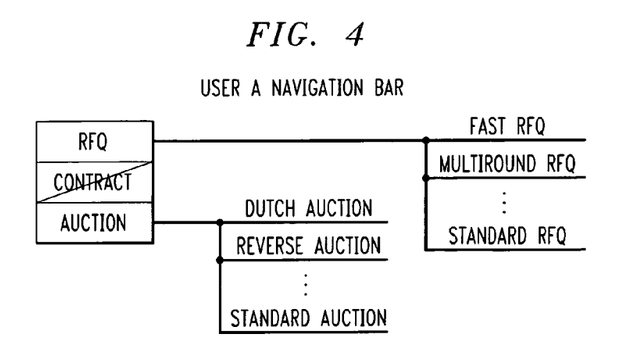
FIG. 4 illustrates an exemplary user interface that allows a user to select a domain and flow for a given business object in accordance with one embodiment of the present invention.

Once the business process manager has determined the set of flows which a user may access, it can provide a list of the valid choices to the user interface, perhaps a Java Server Page, as shown in FIG. 4 for the example of FIG. 3. For example, the user interface could display only the valid choices in some form (e.g., using a menu, buttons, or drop down list) or graying out and making options which are not supported for this user non-selectable. Using either one of these options, the user is allowed only to make choices that are valid to their identity or role. Although a sophisticated user may try to bypass the limited choices which are presented by their graphic user interface (GUI) by trying to construct and submit a prohibited choice, our system would prohibit the action(s) since the guards on the transition would reject access. Therefore, the user will be stopped from executing any restricted commands.

Figure 6:
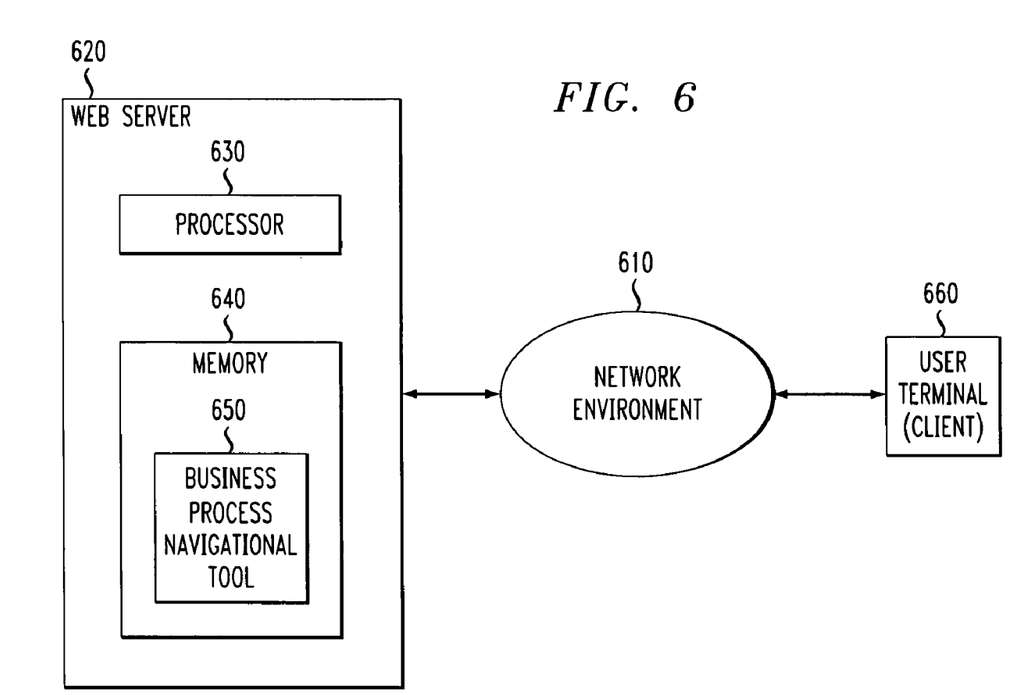
FIG. 6 illustrates an exemplary network environment in which the present invention can operate.
Figure 7:
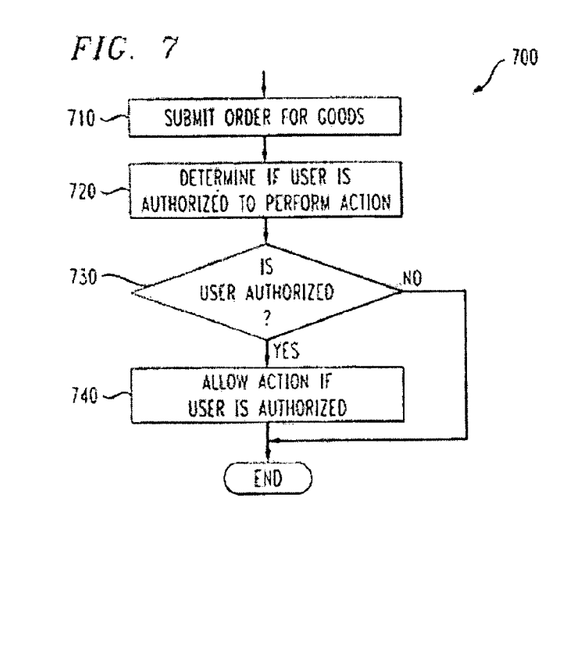
FIG. 7 illustrates an exemplary method for controlling the actions of a user of a business process in accordance with one embodiment of the present invention.

FIG. 6 illustrates an exemplary network environment 610 in which the present invention can operate. As shown in FIG. 6, a web server 620 communicates over a network 610 with a user terminal 660. For example, the user 660 may submit an order for goods or services to the web server 620. The process that determines whether a given user has sufficient authorization to perform a certain task may be managed in accordance with a business process navigational tool 650 incorporating features of the present invention, as discussed above. The network 610 can be any wired or wireless network for transferring information, such as a data network or a telephone network.

Memory 640 will configure the processor 630 to implement the methods, steps, and functions disclosed herein. The memory 640 could be distributed or local and the processor 630 could be distributed or singular. The memory 640 could be implemented as an electrical, magnetic or optical memory, or any combination of these or other types of storage devices. The term "memory" should be construed broadly enough to encompass any information able to be read from or written to an address in the addressable space accessed by processor 630. With this definition, information on a network 610 is still within memory 640 of the web server 620 because the processor 630 can retrieve the information from the network 610.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It is to be understood that the embodiments and variations shown and described herein are merely illustrative of the principles of this invention and that various modifications may be implemented by those skilled in the art without departing from the scope and spirit of the invention.

What is claimed is:

1. A method for managing business processes, the method comprising:
    supporting a plurality of trading mechanisms for a plurality of organizations;
    defining a plurality of flow types for each of the plurality of trading mechanisms;
    defining one or more business processes for each of the plurality of flow types, each of the one or more business processes of each flow type including a start state and one or more transitions from the start state to one or more additional states, wherein each of the one or more transitions from the start state includes at least one associated control guard; and
    using the at least one control guard of each of the one or more transitions to restrict access of a user to the one or more additional states of the corresponding business process, wherein using the at least one control guard to restrict access includes referencing the at least one control guard in each of the one or more transitions from the start state of each of the one or more business processes of each flow type to determine an access ability of the user to access the trading mechanisms, the flow types, and the one or more business processes of each flow type, wherein the restricting access of the user is based on the determined access ability of the user, and wherein the access ability of the user is determined at least in part based on referencing data describing which particular ones of the trading mechanisms, the flow types, and the business processes are used and allowed by a particular organization to which the user belongs of the plurality of organizations.

2. The method of claim 1, wherein the plurality of trading mechanisms include an auction mechanism, a contract mechanism, and a request for quotes mechanism.

3. The method of claim 1, wherein the plurality of flow types for each of the trading mechanisms include a buyer flow type and a seller flow type.

4. The method of claim 1, wherein each of the one or more business processes defines an order of steps required to produce an object.

5. The method of claim 1, wherein the at least one control guard is an access control guard or a business control guard.

6. The method of claim 1, wherein using the at least one control guard comprises:
    referencing the at least one control guard in each of the one or more transitions from the start state of each of the one or more business processes of each flow type to determine a set of options available to the user; and
    presenting the set of options available to the user, the set of options including at least one of the plurality of trading mechanisms, at least one of the plurality of flow types defined for the at least one trading mechanism, and at least one of the one or more business processes defined for the at least one flow type.

7. The method of claim 6, wherein one or more of the trading mechanisms, flow types, or business processes having restricted access are not available to the user and are presented to the user in a non-selectable fashion.

8. The method of claim 1, wherein the access ability of the user is based on an authorization from the particular organization to which the user belongs.

9. The method of claim 1, further comprising filtering at least one additional business process of at least one of the flow types so that at least one control guard associated with the filtered additional business processes is not referenced to determine the access ability of the user for the at least one additional business process, the filtering based on information associated with the user and stored in a table.

10. The method of claim 9, wherein using the at least one control guard includes determining a set of options available to the user based on the determined access ability of the user, and presenting the set of options available to the user, the set of options including at least one of the plurality of trading mechanisms, at least one of the plurality of flow types defined for the at least one trading mechanism, and at least one of the one or more business processes defined for the at least one flow type.

11. The method of claim 8, wherein for at least one of the flow types, the one or more business processes are a plurality of business processes.

12. A system for managing business processes, the system comprising:
    a memory storing computer readable code; and
    a processor operatively coupled to the memory, the processor configured to implement the computer readable code, wherein the computer readable code comprises instructions for:
        supporting a plurality of trading mechanisms for a plurality of organizations;

defining a plurality of flow types for each of the plurality of trading mechanisms;

defining one or more business processes for each of the plurality of flow types, each of the one or more business processes of each flow type including a start state and one or more transitions from the start state to one or more additional states, wherein each of the one or more transitions from the start state includes at least one associated control guard; and using the at least one control guard of each of the one or more transitions to restrict access of a user to the one or more additional states of the corresponding business process, wherein using the at least one control guard to restrict access includes referencing the at least one control guard in each of the one or more transitions from the start state of each of the one or more business processes of each flow type to determine an access ability of the user to access the trading mechanisms, the flow types, and the one or more business processes of each flow type, wherein the restricting access of the user is based on the determined access ability of the user, and wherein the access ability of the user is determined at least in part based on referencing data describing which particular ones of the trading mechanisms, the flow types, and the business processes are used and allowed by a particular organization to which the user belongs of the plurality of organizations.

13. The system of claim 12, wherein the plurality of trading mechanisms include an auction mechanism, a contract mechanism, and a request for quotes mechanism.

14. The system of claim 12, wherein the plurality of flow types for each of the trading mechanisms include a buyer flow type and a seller flow type.

15. The system of claim 12, wherein the computer readable code further comprises instructions for filtering at least one additional business process of at least one of the flow types so that at least one control guard associated with the filtered additional business processes is not referenced to determine the access ability of the user for the at least one additional business process, the filtering based on information associated with the user and stored in a table.

16. A computer readable medium encoded with computer readable code for managing business processes, the computer readable code comprising instructions implemented by a computer system for:

supporting a plurality of trading mechanisms for a plurality of organizations;

defining a plurality of flow types for each of the plurality of trading mechanisms;

defining one or more business processes for each of the plurality of flow types, each of the one or more business processes of each flow type including a start state and one or more transitions from the start state to one or more additional states, wherein each of the one or more transitions from the start state includes at least one associated control guard; and using the at least one control guard of each of the one or more transitions to restrict access of a user to the one or more additional states of the corresponding business process, wherein using the at least one control guard to restrict access includes referencing the at least one control guard in each of the one or more transitions from the start state of each of the one or more business processes of each flow type to determine an access ability of the user to access the trading mechanisms, the flow types, and the one or more business processes of each flow type, wherein the restricting access of the user is based on the determined access ability of the user, and wherein the access ability of the user is determined at least in part based on referencing data describing which particular ones of the trading mechanisms, the flow types, and the business processes are used and allowed by a particular organization to which the user belongs of the plurality of organizations.

17. The computer readable medium of claim 16, wherein the plurality of trading mechanisms include an auction mechanism, a contract mechanism, and a request for quotes mechanism.

18. The computer readable medium of claim 16, wherein the plurality of flow types for each of the trading mechanisms include a buyer flow type and a seller flow type.

19. The computer readable medium of claim 16, wherein using the at least one control guard comprises:

referencing the at least one control guard in each of the one or more transitions from the start state of each of the one or more business processes of each flow type to determine a set of options available to the user; and presenting the set of options available to the user, the set of options including at least one of the plurality of trading mechanisms, at least one of the plurality of flow types defined for the at least one trading mechanism, and at least one of the one or more business processes defined for the at least one flow type.

20. The computer readable code of claim 16, wherein the computer readable code further comprises instructions for filtering at least one additional business process of at least one of the flow types so that at least one control guard associated with the filtered additional business processes is not referenced to determine the access ability of the user for the at least one additional business process, the filtering based on information associated with the user and stored in a table.

* * * * *

UNITED STATES PATENT AND TRADEMARK OFFICE
CERTIFICATE OF CORRECTION

PATENT NO. : 7,627,484 B2 Page 1 of 1
APPLICATION NO. : 09/951024
DATED : December 1, 2009
INVENTOR(S) : Cohen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Second Day of November, 2010

David J. Kappos
*Director of the United States Patent and Trademark Office*